United States Patent [19]

Yasukawa

[11] Patent Number: 4,457,588

[45] Date of Patent: Jul. 3, 1984

[54] REMOVAL OF STATIC ELECTRICITY ON A LIQUID CRYSTAL DISPLAY DURING RUBBING PROCESS

[75] Inventor: Yozo Yasukawa, Yamatokoriyama, Japan

[73] Assignee: Sharp Kabushiki Kaisha, Osaka, Japan

[21] Appl. No.: 32,773

[22] Filed: Apr. 24, 1979

[30] Foreign Application Priority Data

Apr. 25, 1978 [JP] Japan ................................. 53-49685

[51] Int. Cl.³ ............................................. G02F 1/133
[52] U.S. Cl. .................................................... 350/336
[58] Field of Search ................... 350/331 R, 336, 334, 350/341

[56] References Cited

U.S. PATENT DOCUMENTS 3,781,863  12/1973  Fujita ............................ 350/336 X
3,807,831  4/1974   Soref ............................. 350/336 X
3,902,790  9/1975   Hsieh et al. ....................... 350/334
4,181,563  1/1980   Miyaka et al. .................. 350/336 X Primary Examiner—John K. Corbin
Assistant Examiner—David Lewis
Attorney, Agent, or Firm—Birch, Stewart, Kolasch & Birch

[57] ABSTRACT

An electrode segment structure comprises at least two adjacent segments and one or more short-circuiting strips formed to provide a short-circuiting path between the two adjacent segments. The overall segments have a minus-in-square numeric configuration, for example. The electrode segment structure is formed on a substrate which is adapted for use in a liquid crystal display cell. To complete the manufacture of the liquid crystal display cell, the substrate carrying the short-circuiting strips are cut together so that the respective segments can not be short-circuited.

3 Claims, 4 Drawing Figures

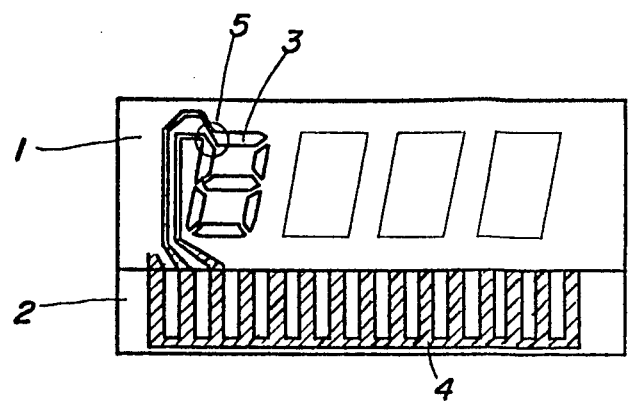
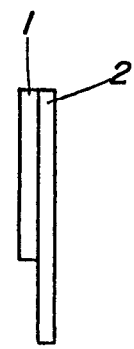
FIG.1  FIG.2
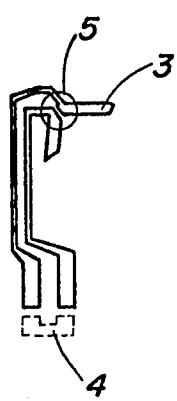
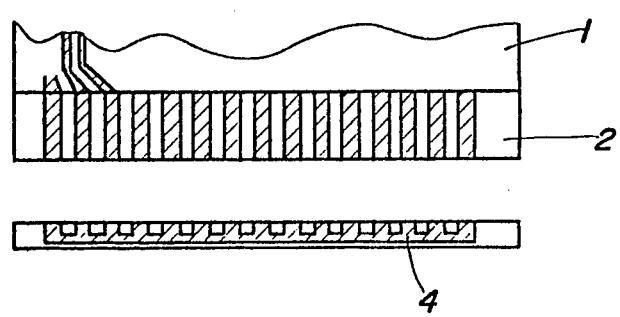
FIG.3  FIG.4

REMOVAL OF STATIC ELECTRICITY ON A LIQUID CRYSTAL DISPLAY DURING RUBBING PROCESS

BACKGROUND OF THE INVENTION

The present invention relates to a liquid crystal dislay and, more particularly, to an electrode pattern effective to remove static electricity accumulated on a liquid crystal display during the rubbing process.

One of the conventional treatments for the orientation technique of a liquid crystal mixture such as twistednematic type has been known as the rubbing technique which is fully disclosed in Raynes, U.S. Pat. No. 4,084,884, issued Apr. 18, 1978, entitled "LIQUID CRYSTAL DEVICES", for example.

The rubbing technique, however, suffered from the problems that electrostatic energy greatly and necessarily occurred on the surface of electrodes by the rubbing technique and was susceptible to the influence of spark discharges between the electrodes. The surface conditions of rubbed layers could be damaged by heat from the spark discharges to thereby lower the reliability of the orientation technique.

OBJECTS AND SUMMARY OF THE INVENTION

Accordingly, it is the primary object of the present invention to provide an effective orientation technique in preparing a liquid crystal display.

It is a further object of the present invention to provide an improved electrode structure for a liquid crystal display by preventing the generation of the spark discharge by electrostatic energy where electrostatic energy is generally developed during the rubbing technique in obtaining molecular alignment in a liquid crystal mixture of the liquid crystal display.

It is a further object of the present invention to provide an improved electrode structure for a liquid crystal display where there are formed short-circuiting portions to eliminate the possibility of spark discharges by electrostatic energy which is produced by the rubbing technique to provide molecular orientation of a liquid crystal mixture contained within the liquid crystal display.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electrode segment structure comprises at least two adjacent segments and one or more short-circuiting strips formed to provide a short-circuiting path between the two adjacent segments. The overall segments have a minus-in-square numeric configuration, for example.

The electrode segment structure is formed on a substrate which is adapted for use in a liquid crystal display cell. To complete the manufacture of the liquid crystal display cell, the substrate carrying the short-circuiting strips are cut together so that the respective segments can not be short-circuited.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a plan view of an adaptation of a glass substrate to the other glass substrate carrying an electrode structure of the present invention for use in a liquid crystal display cell;

FIG. 2 is a side view of the adaptation shown in FIG. 1;

FIG. 3 is an enlarged view of segments contained within the electrode structure shown in FIG. 1; and FIG. 4 is a plan view of the other glass substrate illustrating the portion of the same to be cut, to make the liquid crystal display cell.

DESCRIPTION OF THE INVENTION

Turning now to the drawings, in which similar reference characters denote similar elements throughout the several views, FIGS. 1 and 2 illustrate a combination of a first glass substrate 1 and a second glass substrate carrying an electrode structure of the present invention. A transparent electrode and a short-circuiting portion denoted as 3 and 4, respectively, are patterned as the electrode structure of the present invention.

With reference to FIG. 1, the transparent electrode 3 has the short-circuiting portion 4 on the second glass substrate 2 and at the outside of a housing defined by the two glass substrates 1 and 2.

The short-circuiting portion 4 is produced with the same mask pattern used for the transparent electrode 3 and made of the same material as in the transparent electrode 3.

The short-circuiting portion 4 is provided for preventing spark discharges from taking place even though electrostatic energy has been produced according to the so-called rubbing technique. This is because the short-circuiting portion 4 assures that the respective transparent electrode segments defined by the transparent electrode 3 are at the same potential.

Conventionally, the spark discharges were generated at the close separation portions of adjacent transparent electrode segments as indicated by a circle 5 shown in FIG. 3. Heat and the like produced by the spark discharges damaged the surface of the transparent electrode 3 and the second glass substrate 2. These failures can be eliminated by the provision of the short-circuiting portion 4 according to the present invention.

An appropriate liquid crystal mixture is filled within the housing defined by the two glass substrates 1 and 2 to complete the liquid crystal display cell. After the completion of the liquid crystal display cell, the portion of the second glass substrate 2, on which the short-circuiting portion 4 is carried, is cut off as illustrated in FIG. 4. Therefore, the respective transparent electrode segments become independent of each other. To complete an external circuit for the liquid crystal display cell, terminals of the thus composed liquid crystal display cell are connected to terminals for a desired circuit board including a driver circuit element such as an integrated circuit. This circuit board may include a control circuit element for generating control signals applied to the driver circuit element according to the results of calculations or the like.

It will be apparent that the short-circuiting portion 4 may be formed on the edge portion of a unit board which is to carry a liquid crystal display cell and suitable circuit elements. In this case, the short-circuiting portion 4 is positioned in such a manner that the circuit elements are to be installed between the liquid crystal display cell and the short-circuiting portion 4. The circuit elements should be arranged on the unit board after the short-circuiting portion 4 has been cut off. This is because there is a fear of damaging the circuit element if the circuit elements are short-circuited.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An intermediately formed substrate used in the ultimate manufacture of a liquid crystal display cell, comprising:
   a substrate; and
   an electrode configuration formed on said substrate, said electrode configuration including a plurality of display segment electrodes and a plurality of electrode leads electrically connected to said display segment electrodes,
   said electrode leads extending to a point near an edge of said substrate;
   a short circuiting bar means connected to one end of the electrode leads and arranged along said edge of said substrate for substantially eliminating an electrical potential developed between the electrode leads;
   whereby said short circuiting bar means prevents arc discharge between the display segment electrodes during the manufacture of said liquid crystal display cell and is adapted to be separated from said electrode leads upon the completion of the manufacture of the liquid crystal display cell.

2. An intermediately formed substrate in accordance with claim 1 wherein said plurality of display segment electrodes formed on said substrate is shaped in the form of a four-sided geometrical figure and a single segment is horizontally disposed within said geometrical figure.

3. A process for manufacturing a liquid crystal display cell comprising the steps of:
   forming an electrode configuration on a first substrate, said electrode configuration including at least two electrode segments and a short-circuiting portion connected to the leads from said electrode segments for electrically short circuiting said electrode segments;
   performing a molecular orientation technique on said first substrate to obtain a molecular orientation of a liquid crystal mixture, said performing step producing electrostatic energy between adjacent ones of said electrode segments, said short circuiting portion being positioned relative to the leads from said electrode segments to prevent the generation of a spark discharge between the adjacent electrode segments occurring as a result of the accumulated electrostatic energy;
   disposing a second substrate over at least a portion of said electrode configuration on said first substrate thereby forming a housing, said portion of said electrode configuration not including said short-circuiting portion;
   injecting said liquid crystal mixture into said housing; and
   cutting said first substrate along a predetermined line to separate said short-circuiting portion from said electrode segments.

* * * * *